June 11, 1940.   L. MEYER   2,204,279
PISTON LOCKING DEVICE
Filed Nov. 23, 1938
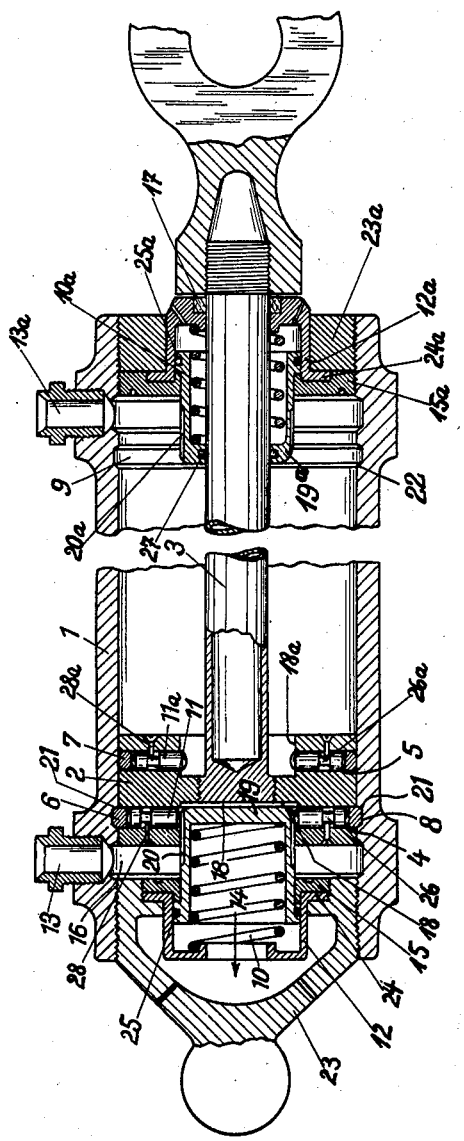
Inventor:
Ludwig Meyer
by Grant F Baldwin
his Attorney.

Patented June 11, 1940

2,204,279

UNITED STATES PATENT OFFICE 2,204,279

PISTON LOCKING DEVICE

Ludwig Meyer, Dessau, Germany, assignor to Junkers Flugzeug-und-Motorenwerke Aktiengesellschaft, Dessau, Germany, a corporation of Germany Application November 23, 1938, Serial No. 242,050
In Germany November 26, 1937

9 Claims. (Cl. 121—40)

This invention relates to improvements in piston locking devices by which pistons may be securely held in their cylinders against accidental movement at either or both ends of their stroke.

It is an object of the invention to provide a piston locking device comprising locking means carried by the piston to engage the cylinder wall and means mounted in the cylinder for cooperating with the locking means.

Another object of the invention is to provide such a piston ring locking device wherein locking rings are carried by the piston one to engage an annular groove formed in the cylinder wall adjacent each extremity of the cylinder, and resilient actuating means mounted at each extremity of the cylinder one to coact with each locking ring.

A further object of the invention is to provide such a piston ring locking device wherein one actuating means is so arranged at each extremity of the cylinder that it is moved axially by the pressure medium by which the piston is subsequently moved to permit release of one locking ring from its cylinder groove before commencement of movement of the piston; and wherein the actuating means remain substantially stationary in the cylinder during the axial movement of the piston and the locking rings carried thereby.

Yet another object of the invention is to provide such a piston locking device which is relatively simple to manufacture and light in weight, so as to render it suitable for use on airplane landing gears.

Having thus briefly enumerated some of the objects of the invention I will now proceed to describe an embodiment thereof with the aid of the accompanying drawing, in which:

Figure 1 illustrates a longitudinal section of a cylinder and piston to which the invention is applied.

Referring to the drawing, I designates a cylinder having a piston 2 therein which is adapted to be moved axially by a pressure medium—either liquid or fluid—admitted through one of the cylinder ports 13 or 13a. Extending from the piston 2 is a piston rod 3.

Around the periphery of the piston 2 annular grooves 4 and 5 are formed to receive locking rings 6 and 7 adapted to be expanded to engage annular grooves 8 and 9 respectively formed in the cylinder wall one adjacent each extremity of the cylinder 1. I will now describe a preferred form of construction of the means provided at the cylinder extremities for expanding the locking rings 6 and 7, which are resilient and tend to contract to a diameter smaller than that of the cylinder bore, and for releasing them to permit them to contract and withdraw from the cylinder grooves 8 and 9 respectively prior to commencement of movement of the piston 2.

Mounted in one extremity of the cylinder 1 and projecting centrally through one cylinder cover 23 is an annular retainer 12 having an external flange 24 around its inner extremity which is positioned within the said cover and is held against the inner face of the latter by an annular nut 15, the bore of which is smaller than that of the said retainer 12. A plunger 19 extends through the annular nut 15 and terminates at its outer extremity in an enlarged peripheral portion which is axially slidable in the retainer 12. Thus inward movement of the plunger 19 is limited by the nut 15. A packing ring 25 is provided around the periphery of that portion of the plunger 19 which is slidable in the retainer 12 to prevent leakage, and the plunger is urged inwardly into the cylinder by a helical spring 10 the outer extremity of which bears against an internal flange carried by the outer extremity of the retainer 12. Formed longitudinally in the outer periphery of the plunger 19 from its inner extremity are a plurality of channels 20.

Similarly an annular retainer 12a, which in this case is apertured for the passage of the piston rod 3 therethrough, projects centrally through the cylinder cover 23a and has an external flange 24a thereon which bears against the inner face of the cover 23a and is held thereagainst by an annular nut 15a. The latter similarly limits the inward movement of a plunger 19a the outer extremity of which is axially slidable in the retainer 12a. 25a denotes a packing ring around the plunger to prevent leakage between the latter and the bore of the retainer 12a. Packing rings 17 and 27 are also provided to prevent the escape of the pressure medium around the rod 3; the ring 17 is mounted in the retainer 12a and the ring 27 in the inner extremity of the plunger 19a, which is centrally apertured for the passage of the said rod therethrough. The plunger 19a is urged inwardly into the cylinder by a spring 10a the outer extremity of which is supported by the outer annular portion of the retainer 12a through which the piston rod 3 slides. 20a denotes a plurality of longitudinal channels formed in the outer periphery of the plunger 19a from its inner extremity.

Formed in opposite sides of the piston 2 are concentric recesses 18 and 18a, and extending radially from the latter through passages formed through the said piston are pins 11 and 11a which are adapted to project into the piston grooves 4 and 5 and expand the rings 6 and 7 respectively. These pins 11 and 11a have annular grooves 26 and 26a formed around them intermediately of their length into which holding elements 28 and 28a respectively mounted in the piston 2 extend to limit the axial movement of the said pins.

The operation of the locking device is briefly as follows: As the piston 2 reaches the left end of its stroke the plunger 19 enters the recess 18 and contacts the inner extremities of the pins 11. The plunger 19 is then moved axially in the direction of the arrow 14 against the tension of the spring 10 by the piston 2 until the locking ring 6 is in registry with the cylinder groove 8. Then the spring pressed plunger 19 forces the pins 11 radially outward thereby expanding the ring 6 and moving it into engagement with its groove 8. When it is desired to move the piston 2 in the opposite direction a pressure medium is introduced into the cylinder 1 through the port 13. This medium flows into the cylinder end 16 and through the channels 20 between the base of the piston recess 18 and the adjacent extremity of the plunger 19, where it exerts pressure upon the latter and forces it outward against the tension of the spring 10. The locking ring 6, the resilience of which tends to contract it, then withdraws itself from the groove 8 and moves the pins 11 radially inward. The expansion force of the spring 10 and the contracting force of the rings 6 and 7 bear a definite relationship to the pressure of the fluid admitted to the cylinder. The pressure is so proportioned that it overcomes the force of the spring 10 on the one hand, but on the other the force which it exerts on the rings 6 and 7 is insufficient to prevent the rings from contracting to their smaller diameter when the plunger is forced away from the pins 11. As soon as the locking ring 6 disengages the groove 8 the piston 2 is moved towards the opposite extremity of the cylinder where the locking ring 7 is similarly expanded to engage the cylinder groove 9.

The coacting annular inner margins of the rings 6 and 7 and the cylinder grooves 8 and 9 may be chamfered as indicated at 21 and 22 to facilitate disengagement of the former from the latter. It will also be noted that the inward movement of the locking rings 6 and 7 may be regulated as to distance by the width of the annular grooves 26 and 26a into which the elements 28 and 28a respectively extend.

While in the foregoing the preferred embodiment of the invention has been shown it is understood that the construction is susceptible to such modifications and variations as fall within the scope of the claims.

What I claim is:

1. A piston locking device comprising a cylinder having an annular groove formed therein, a piston mounted for axial movement therein, a resilient locking ring mounted around the piston for movement therewith adapted to engage said groove and hold the piston immovable, a spring actuated member mounted adjacent one extremity of the cylinder, sliding means extending through the piston in contact with said ring to change its diameter, said sliding means being adapted to be actuated by said member upon movement of the piston, and said spring actuated member being adapted to be moved from said sliding means by a pressure medium admitted into the cylinder to move the piston.

2. A piston locking device comprising a cylinder having an annular groove formed therein, a piston mounted therein, a resilient locking ring mounted around the piston for movement therewith adapted to engage said groove and lock the piston, a spring actuated member mounted adjacent one extremity of the cylinder, sliding means extending through the piston adapted to expand the ring and force it into engagement with the cylinder groove, said spring actuated member being adapted to move the sliding means as the piston advances towards said member, said member being adapted to be moved from said sliding means by a pressure medium admitted into the cylinder to move the piston, and said ring being adapted to contract and withdraw from the cylinder groove.

3. A piston locking device comprising the combination set forth in claim 2, wherein means are provided for limiting the movement of the sliding means.

4. A piston locking device comprising a cylinder having an annular groove formed therein, a piston mounted for sliding movement in the cylinder, a resilient locking ring mounted in a groove formed around the piston and adapted to engage the cylinder groove to hold the piston immovable, said piston having a recess formed therein, means mounted for sliding movement through the piston extending from the recess into the piston groove, a spring actuated plunger adapted to enter said recess as the piston is moved, said plunger being adapted to move the sliding means and expand said ring, and means through which a pressure medium is admitted into the recess between the base of the latter and the plunger to move the plunger outwardly and disengage said sliding means, said ring being adapted to contract and withdraw from the cylinder groove.

5. A piston locking device comprising the combination set forth in claim 4, wherein the plunger and the recess are coaxial with the piston, said sliding means being mounted for radial movement through the piston.

6. A piston locking device comprising the combination set forth in claim 4, wherein the means through which the pressure medium is admitted into the recess consists of longitudinal channels formed in the periphery of the plunger.

7. A piston locking device comprising a cylinder having an annular groove formed therein, a cover thereon, a piston mounted for axial movement in the cylinder, a resilient locking ring mounted in a groove formed around the piston periphery, adapted to engage the cylinder groove and hold the piston immovable, a spring actuated plunger mounted in said cover, means limiting the movement of the plunger into the cylinder, a recess formed in the face of the piston adjacent the plunger, pins extending from the recess into the ring groove of the piston through the latter, said plunger being adapted to enter said recess as the piston advances and force the pins outwardly to expand the ring into engagement with the cylinder groove, and means through which a pressure medium is admitted between the base of the recess and the plunger from the cylinder bore to force the plunger outwardly, said ring being adapted to contract and withdraw from the cylinder groove.

8. A piston locking device comprising a cylinder having annular grooves formed therein adjacent its extremities, a piston mounted for axial movement therein, resilient locking rings mounted in the piston periphery, each ring being adapted to engage one cylinder groove and hold the piston immovable, said piston having a concentric recess formed in each face, a spring actuated plunger mounted in each extremity of the cylinder and concentrically therewith, a piston rod extending from the piston projecting through one extremity of the cylinder and through one plunger, radially disposed pins extending through apertures formed in the piston from each recess to the inner periphery of one ring, means limiting the inward movement of said pins, each plunger being adapted to enter one recess as the piston advances and move the pins extending into said recess axially outward to expand the ring with which they coact and force said ring into engagement with its cylinder groove, and said plungers having longitudinal channels formed in their periphery to permit a flow of a pressure medium into the space between the base of each recess and its cooperating plunger from the adjacent end of the cylinder.

9. A piston locking device comprising, a cylinder having a groove in the wall thereof adjacent one end, a piston mounted for axial movement in the cylinder, a locking mechanism carried by said piston including a part projectible outwardly from the piston and into the groove in the wall of the cylinder when the piston is advanced to a predetermined position adjacent said end of the cylinder, a member for actuating said locking mechanism, means mounting said member on the cylinder adjacent said end thereof for limited movement relative to the cylinder, means for admitting fluid under pressure to said end of the cylinder, said piston and said member both being responsive to such admission of fluid pressure to move in one direction along their respective paths of movement, and spring means yieldingly urging said member in the direction opposite to that in which it is urged by said fluid pressure, said member having a camming face adapted when the piston approaches said end of the cylinder to engage a part of said locking mechanism and thrust the latter outwardly into the groove in the wall of the cylinder to lock the piston assembly against movement, said member adapted when influenced by the admission of said fluid pressure to move against the resistance of said spring means sufficient to free the locking mechanism for withdrawal from the groove in the cylinder wall.

LUDWIG MEYER.